United States Patent [19]
Baker et al.

[11] Patent Number: 5,864,444
[45] Date of Patent: Jan. 26, 1999

[54] ACTUATOR ARM BUMPER IN A DISC DRIVE

[75] Inventors: Jon Patrick Baker, Oklahoma City; Kenneth Lee Pottebaum, Yukon, both of Okla.

[73] Assignee: Seagate Technology, Inc., Scotts Valley, Calif.

[21] Appl. No.: 724,547

[22] Filed: Sep. 30, 1996

[51] Int. Cl.$^6$ .................................................. G11B 21/22
[52] U.S. Cl. ........................................... 360/105; 360/104
[58] Field of Search .................................. 360/104, 105, 360/106, 97.02, 97.01, 98.01

[56] References Cited

U.S. PATENT DOCUMENTS

| | | | |
|---|---|---|---|
| 3,713,121 | 1/1973 | Fassano et al. | 360/103 |
| 4,843,503 | 6/1989 | Hazebrouck et al. | 360/106 |
| 5,422,770 | 6/1995 | Alt | 360/105 |

FOREIGN PATENT DOCUMENTS

| | | |
|---|---|---|
| 4-97085 | 3/1992 | Japan . |
| 4-188476 | 7/1992 | Japan . |

*Primary Examiner*—Stuart S. Levy
*Assistant Examiner*—William J. Klimowicz
*Attorney, Agent, or Firm*—Bill D. McCarthy; Edward P. Heller, III; Randall K. McCarthy

[57] ABSTRACT

An actuator arm bumper for dampening contact between a surface of an actuator arm and a surface of a disc in a disc drive. The actuator arm bumper comprises a non-marring, non-particulating and durable material such as polycarbonate which extends through and beyond the cross-sectional thickness of the actuator arm. The actuator arm bumper is formed from a sphere or rod of polycarbonate material which is placed into an opening of the actuator arm and deformed using a heat staking or crimping operation. A ramp loading installation tool is also used to simultaneously form all of the actuator arm bumpers in the actuator arms of the disc drive.

9 Claims, 3 Drawing Sheets

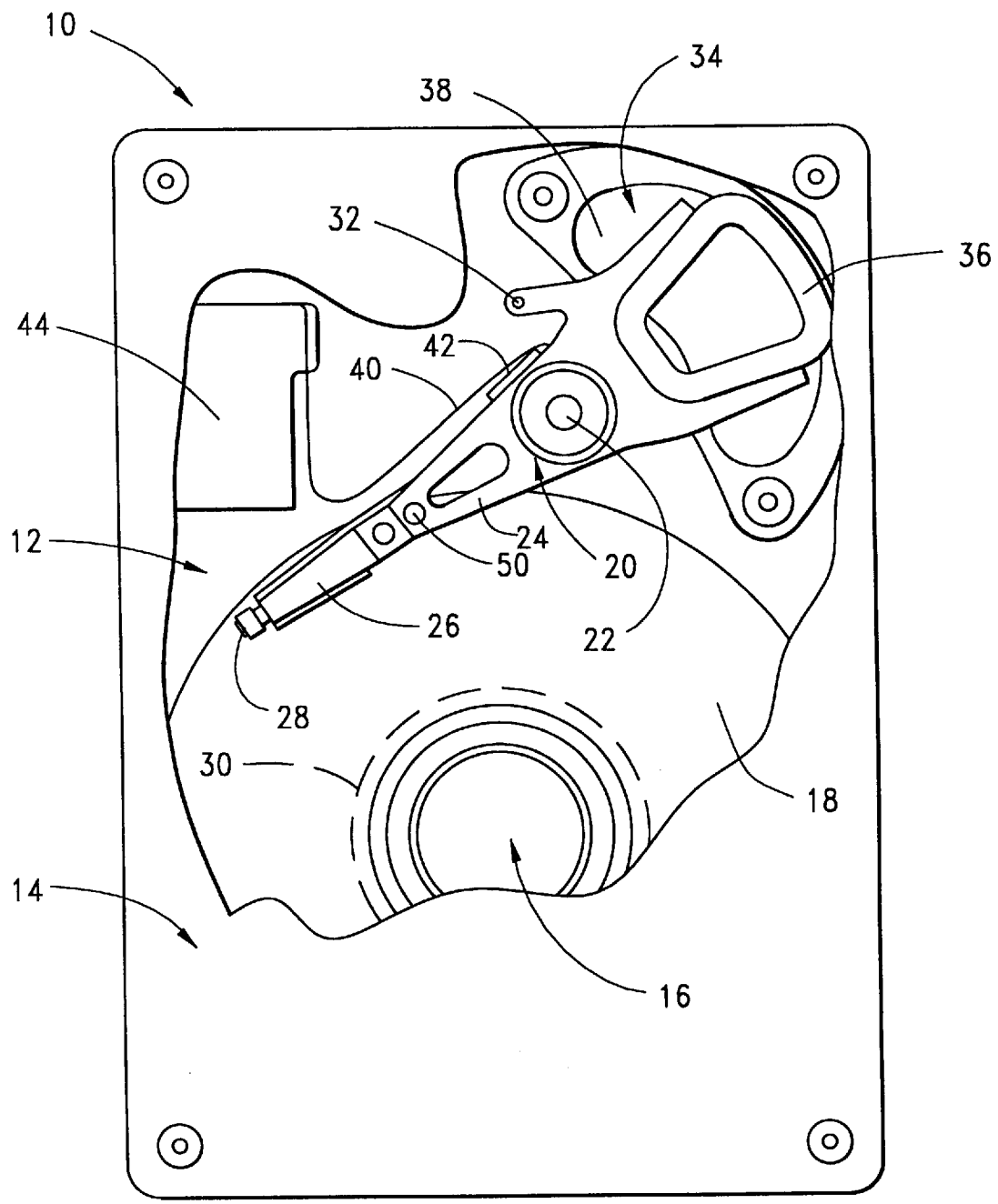
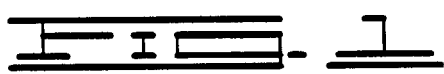

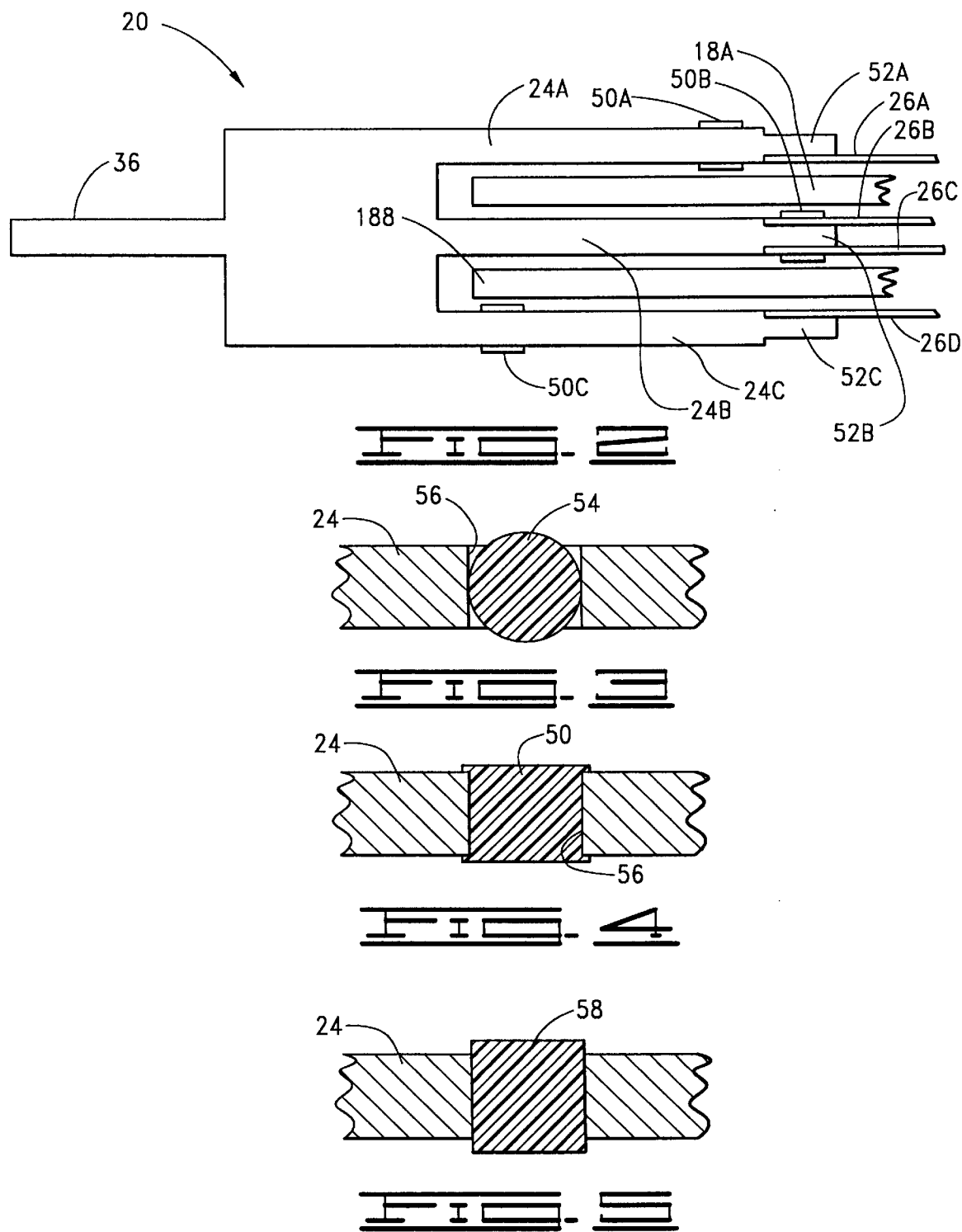

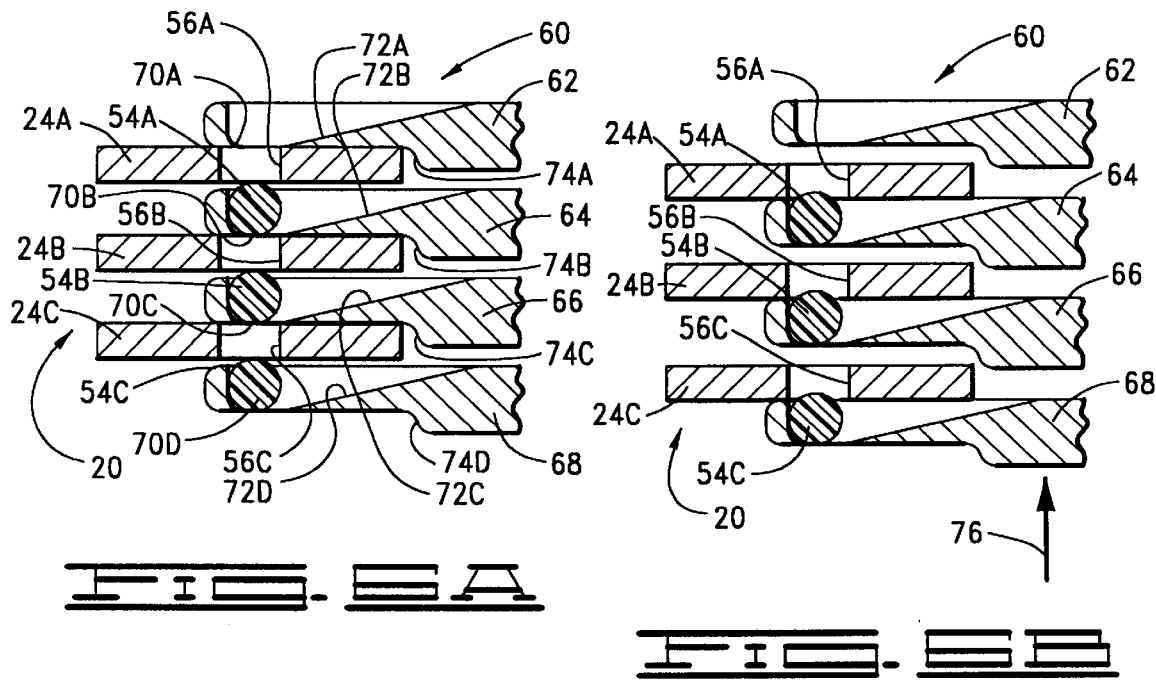
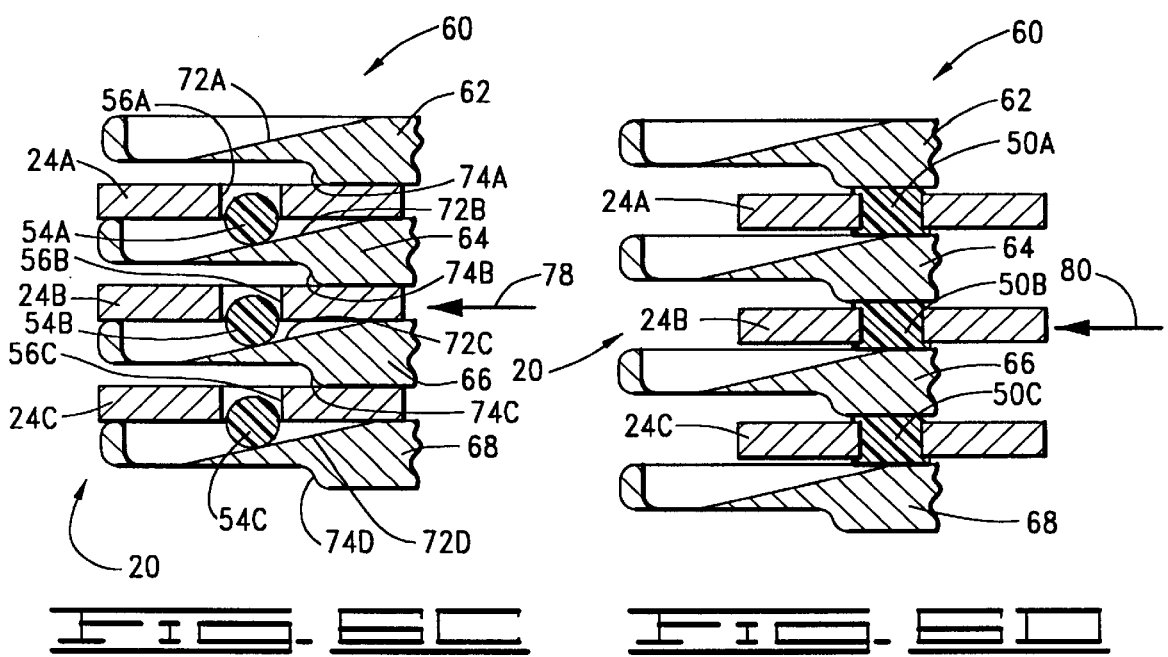

ACTUATOR ARM BUMPER IN A DISC DRIVE

CROSS-REFERENCE TO RELATED APPLICATIONS

"Not applicable"

STATEMENT REGARDING FEDERALLY SPONSORED RESEARCH OR DEVELOPMENT

"Not applicable"

BACKGROUND OF THE INVENTION

This invention relates generally to the field of disc drive data storage devices, and more particularly, but not by way of limitation, to the protection of a hard disc drive from damage due to mechanical shocks to the drive.

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extends generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to air currents caused by rotation of the disc.

Typically, several discs are stacked on top of each other and the surfaces of the stacked discs are accessed by the heads mounted on a complementary stack of actuator arms which compose an actuator assembly, or "E-block". The E-block generally includes head wires which conduct electrical signals from the heads to a flex circuit, which in turn conducts the electrical signals to a flex circuit bracket mounted to a disc drive basedeck. For a general discussion of E-block assembly techniques, see U.S. Pat. No. 5,404,636 entitled METHOD OF ASSEMBLING A DISK DRIVE ACTUATOR, issued Apr. 11, 1995 to Stefansky et al., assigned to the assignee of the present invention and incorporated herein by reference.

As will be recognized, a continuing trend in the industry is the reduction in size of modern disc drives. As a result, the discs in the disc stacks of modern disc drives are increasingly being brought closer together, providing narrower vertical gaps between adjacent discs. Although facilitating greater amounts of storage capacity, such narrow vertical spacing of the discs gives rise to a problem of increased sensitivity of the disc drives to non-operating mechanical shocks; particularly, predominant failure modes in modern disc drives have been found to include damage to the surfaces of the discs and damage to the actuator arms as a result of contact between the actuator arms and the discs from mechanical shocks encountered during the shipping and handling of the drives. Computer modeling has shown that the first mechanical bending mode of the discs typically causes over 50% of the motion between the arms and discs in selected disc drive designs. The bending mode is generally dependent upon the material, diameter and thickness of the discs, and these factors are not readily modified in a disc drive design.

Additionally, as disc drive designs continue to decrease in size, smaller heads, longer and thinner actuator arms, and thinner gimbal assemblies will continue to be incorporated into the drives, significantly increasing the need to protect the disc drive from damage as a result of incidental contact between actuator arm/gimbal assemblies and the surfaces of the discs.

Thus, there is a need for an improved approach to reducing the susceptibility of damage in disc drives as a result of non-operating mechanical shocks.

BRIEF SUMMARY OF THE INVENTION

The present invention provides an actuator arm bumper which dampens and softens the contact between the surface of an actuator arm and the surface of a disc in a disc drive caused by a non-operating mechanical shock.

The actuator arm bumper comprises a non-marring, non-particulating and durable material such as polycarbonate which extends through and beyond the cross-sectional thickness of the actuator arm. The actuator arm bumper, being a softer material than the actuator arm and the disc, serves to dampen the contact and prevent damage to the actuator arm and disc. The actuator arm bumper is preferably formed from a sphere (or other shape, such as a rod) of polycarbonate material which is placed into an opening of the actuator arm and deformed using a heat staking or crimping operation.

A ramp loading installation tool is also preferably used to simultaneously form all of the actuator arm bumpers in the actuator arms of the disc drive, the ramp loading installation tool comprising a plurality of tool arms sized to fit between the actuator arms of an actuator assembly. Each of the tool arms includes a seat for temporarily supporting the bumper material and a ramp for advancing the bumper material into the corresponding opening of the actuator arm as the tool arm is moved relative to the actuator arm. Once the bumper material is placed fully within the opening of the actuator arm, the bumper material is crimped into the final shape of the actuator arm bumper using crimp surfaces of adjacent tool arms.

An object of the present invention is to protect components of a disc drive, including discs and actuator assemblies, from damage due to non-operating, mechanical shocks encountered during shipping and handling of the drive.

Another object of the present invention is to limit the deflection of the disc as a result of a mechanical shock.

Still another object of the present invention is to provide protection from damage due to mechanical shocks in an easily implemented, cost effective manner.

Yet another object of the present invention is to limit the deflection of the actuator assembly relative to the disc during a mechanical shock applied to the drive.

Other objects, advantages and features of the present invention will be apparent from the following description when read in conjunction with the drawings and appended claims.

BRIEF DESCRIPTION OF THE SEVERAL VIEWS OF THE DRAWINGS

FIG. 1 is a top plan view of a disc drive in which the present invention is particularly useful.

FIG. 2 is an elevational view of the actuator assembly and discs of FIG. 1, showing alternative placements for the actuator arm bumper of FIG. 1.

FIG. 3 provides a cross-sectional view of a sphere of bumper material disposed within an opening of one of the actuator arms of FIGS. 1 and 2.

FIG. 4 provides a cross-sectional, detailed view of one of the actuator arm bumpers of FIGS. 1 and 2.

FIG. 5 provides a cross-sectional view of a rod of bumper material disposed within an opening of one of the actuator arms of FIGS. 1 and 2.

FIGS. 6A–6D illustrates a ramp loading installation tool useful in the forming of the actuator arm bumpers of FIGS. 1, 2 and 4.

DETAILED DESCRIPTION OF THE INVENTION

Turning now to the drawings and more particularly to FIG. 1, shown therein is a top plan view of a disc drive 10 in which the present invention is particularly useful. The disc drive 10 includes a basedeck 12 to which various disc drive components are mounted and a top cover 14, which provides a sealed internal environment for the disc drive 10. The top cover 14 is shown in a partial cut-away fashion to expose selected components of interest.

Mounted to the basedeck 12 is a spindle motor (shown generally at 16) to which a plurality of discs 18 are mounted for rotation at a constant high speed. Adjacent the discs 18 is an actuator assembly 20 (hereinafter sometimes also referred to as an "E-block") which pivots about a pivot shaft bearing assembly 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive 10 is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft bearing assembly 22, causing the heads 28 to move across the surfaces of the discs 18.

To provide the requisite electrical conduction paths between the heads 28 and disc drive read/write circuitry (not shown), head wires (not separately shown) are routed on the E-block 20 from the heads 28, along the gimbal assemblies 26 and the actuator arms 24, to a flex circuit assembly 40. The head wires are secured by way of a suitable soldering process to corresponding pads of a printed circuit board (PCB) 42 of the flex circuit assembly 40. In turn, the flex circuit assembly 40 is connected to a flex circuit bracket 44 in a conventional manner, which in turn is connected through the basedeck 12 to a disc drive PCB (not shown) mounted to the underside of the basedeck 12. The disc drive PCB provides the disc drive read/write circuitry used to control the operation of the heads 28, as well as other interface and control circuitry for the disc drive 10.

Of particular interest is an actuator arm bumper 50 shown in FIG. 1, the actuator arm bumper 50 preferably comprising a cylindrically shaped dampening member extending through and beyond the cross-sectional extent of the actuator arm 24. As described below, the actuator arm bumper 50 protects the disc drive 10 from damage by dampening (softening) the contact between the actuator arm 24 and the disc 18 during mechanical shocks applied to the disc drive 10. The actuator arm bumper 50 is preferably formed from a durable non-particulating material, such as polycarbonate, suitable for use in the interior of the disc drive 10.

Referring now to FIG. 2, shown therein is an elevational representation of the actuator assembly 20 of FIG. 1, showing alternative placements for the actuator arm bumper 50 of FIG. 1. To facilitate the discussion with regard to FIG. 2, three actuator arms are identified therein as 24A, 24B and 24C respectively, with the actuator arm 24A corresponding to the top actuator arm 24 of FIG. 1. Additionally, FIG. 2 shows two discs 18A and 18B adjacent the actuator assembly 20, with 18A corresponding to the top disc 18 shown in FIG. 1. It will be recognized that the configuration shown in FIG. 2 has been provided for purposes of discussion and that the present invention can readily be used in drives having different numbers of discs 18 and corresponding actuator arms 24.

Continuing with FIG. 2, gimbal assemblies 26A, 26B, 26C and 26D are shown extending from the actuator arms 24A–C, with the gimbal assembly 26A corresponding to the gimbal assembly 26 shown in FIG. 1. Whereas any of a number of well known methodologies can be employed to attach the gimbal assemblies 26 to the actuator arms 24, it is contemplated that swaging is utilized in the present example. Corresponding swage decks 52A, 52B and 52C are thus provided for each of the actuator arms 24A–C, each of the swage decks 52A–C having a narrower cross-sectional thickness with respect to the rest of the actuator arms 24A–C to accommodate the thicknesses of the gimbal assemblies 26A–D. It will be recognized, however, that in some cases the thicknesses of the gimbal assemblies 26A–D will extend beyond the cross-sectional thicknesses of the actuator arms 24A–C. Further, each of the swage decks 52A–C of FIG. 2 is contemplated as including a corresponding circular hole (not shown) extending therethrough. Each of the gimbal assemblies 26 likewise has a swage extension (not shown) comprising a hollow cylindrical member which is pressed into the corresponding hole of the corresponding swage deck 52A–C to form a conventional swage connection. It will be recognized that each of the swage connections has a resulting swage hole extending through the cross-sectional thickness of the associated swage decks 52A–C and gimbal assemblies 26A–D, the swage holes defined by the inner surfaces of the swage extensions of the gimbal assemblies 26A–D.

FIG. 2 illustrates three different actuator arm bumpers 50A, 50B and 50C, corresponding to the actuator arms 24A–C respectively. Each of the actuator arm bumpers 50A–C is shown to extend beyond the cross-sectional extent of the actuator arms 24A–C a distance sufficient to limit the damage resulting from contact between the actuator arms 24A–C and the discs 18A–B. While it is contemplated that all of the actuator arm bumpers 50 in a particular application would nominally be radially aligned, the actuator arm bumpers 50A–C of FIG. 2 illustrate alternative placements so that the effects of mechanical shock can be minimized in each particular application. For example, it may be desirable in a particular application to provide a plurality of bumpers 50 in each actuator arm 24 in order to accommodate higher mechanical bending modes of the discs 18 and actuator arms 24, as well as to protect the drive 10 regardless of the rotational orientation of the actuator assembly 20 during the occurrence of a mechanical shock.

Continuing with FIG. 2, the actuator arm bumper 50A is located near the distal end of the actuator arm 24A proximate the swage deck 52A. As discussed below, a through hole (not shown) is provided in the actuator arm 24A to accommodate the actuator arm bumper 50A at this location.

As an alternative placement, the actuator arm bumper 50B is located through the gimbal assemblies 26B–C and the swage deck 52B of the actuator arm 24B, utilizing the swage hole of the swage connection to accommodate the actuator arm bumper 50B. Advantages of placing the actuator arm bumper 50B at this location include the ability to extend the bumper 50B farther into the stack of discs 18, as well as the ability to utilize the existing opening in the swage connection, avoiding the necessity of providing an additional hole in the actuator arm 24 to accommodate the actuator arm bumper SOB.

Finally, the third placement is shown in FIG. 2 by the actuator arm bumper 50C, which is provided through the actuator arm 24C near the outer diameter of the discs 18. The optimum placement of the actuator arm bumper 50C will depend in part upon the location of the actuator shaft bearing assembly 22 relative to the discs 18, as the actuator arm bumper 50C should nominally be located within the radial extent of the discs 18 in order to protect the disc drive 10 from damage. As mentioned above, the locations of the actuator arm bumpers 50 in FIG. 2 are provided for purposes of disclosure and are thus not limiting, except as explicitly set forth in the appended claims.

Having concluded the discussion concerning the location of the actuator arm bumpers 50 with respect to the actuator arms 24 and the discs 18, the manner in which the actuator arm bumpers 50 are formed will now be discussed. As provided above, each actuator arm bumper 50 is preferably formed from a non-marring material disposed within a hole of the corresponding actuator arm 24 and extends beyond the cross-sectional extent of the actuator arm 24 sufficiently to protect the disc drive 10 from damage without otherwise interfering with normal operation of the disc drive 10. The material can be secured by way of pressing, heat staking, crimping or the use of a suitable adhesive. The preferred approach, however, is to use a polycarbonate sphere which is placed into a corresponding hole of the actuator arm 24 and then deformed into the desired shape through heat staking or crimping. Other suitable shapes, such as a rod, can likewise be used, depending on the volume of bumper material required in a particular application.

Referring now to FIG. 3, shown therein is a cross-sectional representation of a portion of the actuator arm 24 having a polycarbonate sphere 54 disposed within a hole 56 of the actuator arm 24 (the hole 56 represents any one of the holes discussed in FIG. 2). The diameter of the sphere 54 is sized to generally correspond to the diameter of the hole 56, so that the sphere 54 can be readily centered within the hole 56. Once the sphere 54 is so located, a heat staking or crimping operation is utilized to deform the sphere 54 into the actuator arm bumper 50, as shown in FIG. 4. FIG. 5 shows a polycarbonate rod 58 which is similarly crimped to form the actuator arm bumper 50 of FIG. 4.

Turning now to FIGS. 6A–6D, shown therein is a ramp loading installation tool 60 useful in the installation and crimping of the sphere 54 shown in FIG. 3. Particularly, one of the benefits of the present invention is that the actuator arm bumpers 50 can be accurately and inexpensively fabricated using the installation tool 60.

Beginning with FIG. 6A, shown therein is a cross-sectional representation of the installation tool 60 and the actuator arms 24A–C of the actuator assembly 20. For purposes of clarity, the reference numerals 24A–C identify the actuator arms shown in FIG. 2, although it will be recognized that all of the resulting actuator arm bumpers 50 will be vertically aligned in the present example, as opposed to the various alternative alignments discussed in FIG. 2. Also shown in FIG. 6A are three spheres 54A, 54B and 54C of polycarbonate material similar to the sphere 50 of FIG. 3, and the spheres 54A–C are received by corresponding holes 56A, 56B and 56C, similar to the hole 56 of FIGS. 3 and 4.

The installation tool 60 includes a plurality of nominally identical and vertically aligned tool arms 62, 64, 66 and 68, which are spaced and secured in a conventional manner (not shown in the drawings) with sufficient rigidity to deform the spheres 54A–C as described below. Each of the tool arms 62, 64, 66 and 68 is dimensioned to fit between the actuator arms 24A–C and includes a seat (70A–D, respectively), a ramp (72A–D, respectively) and a lip (74A–D, respectively), the purpose of each to be discussed below.

As shown in FIG. 6A, the spheres 54A–C are first positioned so as to be momentarily supported by the seats 70B–D of the tool arms 64, 66 and 68. The actuator assembly 20 is then positioned so that the holes 56A–C are aligned over the seats 70B–D and the spheres 54A–C.

Next, as shown in FIG. 6B the installation tool 60 is advanced upwardly with respect to the actuator assembly 20 (as indicated by arrow 76) so that the spheres 54A–C partially extend into the holes 56A–C (it will be recognized that the same result can be achieved by moving the actuator assembly 20 downwardly with respect to the installation tool 60). The spheres 54A–C are then further advanced into the holes 56A–C through the transversal movement of the installation tool 60 towards the actuator assembly 20, as shown by arrow 78 of FIG. 6C. That is, FIG. 6C shows the ramps 72B–D to advance the spheres 54A–C into the holes 56A–C as the installation tool is moved relative to the actuator assembly 20. The lips 74A–D serve to guide the actuator arms 24A–C between adjacent pairs of the tool arms 62, 64, 66 and 68, as shown.

Finally, as shown in FIG. 6D the installation tool 60 crimps the spheres 54A–C of FIGS. 6A–6C between adjacent pairs of the tool arms 62, 64, 66 and 68 through the continued advancement of the installation tool 60 towards the actuator assembly 20, as indicated by arrow 80 of FIG. 6D, forming the actuator arm bumpers 50A–C. Once the crimping operation is completed, the actuator assembly 20 is removed from the installation tool 60.

The installation tool 60 thus serves to efficiently form all of the actuator arm bumpers 50 in the actuator assembly 20 simultaneously and can readily be utilized in an automated process during disc drive manufacturing. However, it will be recognized that other similar methodologies could readily be used to fabricate the actuator arm bumpers 50. Additionally, although in the preferred embodiment generally flat surfaces are formed for the top and bottom of the actuator arm bumpers 50, other contours and shapes for these surfaces could readily be used, including wedges, inverted wedges, cones, etc. Such alternative contours and shapes could be formed using appropriate dies in the crimping process or by providing corresponding features on the crimp surfaces of the installation tool 60.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive assembly, comprising:
    a base deck;
    a spindle motor mounted to the base deck;
    a disc mounted to the spindle motor for rotation about a central axis, the disc having a surface having an outer diameter with respect to the central axis;
    an actuator assembly mounted to the base deck adjacent the disc, the actuator assembly controllably rotatable about an axis parallel to the central axis of the disc, the actuator assembly comprising an actuator arm, the actuator arm including a rigid actuator arm portion radially extending adjacent the surface of the disc, the actuator arm portion rigid having a cross-sectional thickness with respect to the central axis of the disc; a flexible suspension fixed to the distal end of the rigid actuator arm portion for supporting a read/write transducer; and
    an actuator arm bumper adjacent the surface of the disc secured to the rigid actuator arm portion radially extending adjacent the surface of the disc, the actuator arm bumper comprising a bumper material emanating from and extending beyond the cross-sectional thickness of the rigid actuator arm portion, the actuator arm bumper contacting the surface the of disc; dampening contact between the rigid actuator arm portion and the surface of the disc, as a result of a mechanical shock supplied to the disc drive assembly.

2. The disc drive assembly of claim 1, wherein the rigid actuator arm portion further comprises a surface nominally parallel to the surface of the disc and sidewalls defining a cross-sectional opening extending through the cross-sectional thickness of the rigid actuator arm portion, the sidewalls normally depending from the surface of the rigid actuator arm portion, wherein the bumper material is disposed within the cross-sectional opening of the rigid actuator arm portion and extends beyond the surface of the rigid actuator arm portion, and wherein the actuator arm bumper contacts the surface of the disc as a result of a mechanical shock supplied to the disc drive assembly.

3. The disc drive assembly of claim 2, wherein the bumper material comprises polycarbonate.

4. The disc drive assembly of claim 2, wherein the actuator arm bumper is formed from a process comprising the steps of:
    providing the bumper material in a configuration having a diameter sized to nominally fit within the opening of the rigid actuator arm portion;
    disposing the bumper material within the cross-sectional opening of the rigid actuator arm portion; and
    deforming the bumper material to form the rigid actuator arm bumper.

5. The disc drive assembly of claim 4, wherein the steps of disposing and deforming the bumper material are performed using a ramp loading installation tool, the ramp loading installation tool comprising:
    a tool arm extending in a direction parallel to the surface of the rigid actuator arm portion, the tool arm comprising:
        a seat for temporarily securing the bumper material;
        a ramp for advancing the bumper material into the opening of the rigid actuator arm portion as the tool arm is moved relative to the rigid actuator arm portion in a direction generally parallel to the surface of the rigid actuator arm portion; and
        a crimp surface for crimping the bumper material to form the actuator arm bumper as the tool arm is moved relative to the rigid actuator arm portion in the direction generally parallel to the surface of the rigid actuator arm portion.

6. In a disc drive of the type having a rotatable disc and a controllably positionable rigid actuator assembly adjacent the disc, the actuator assembly including an actuator arm portion radially extending adjacent a surface of the disc, the rigid actuator arm portion having a surface generally parallel to the surface of the disc; a flexible suspension fixed to the distal end of the rigid actuator arm portion for supporting a read/write transducer; and the improvement comprising:
    dampening means, connected to the actuator arm portion, the dampening means comprising bumper material extending through a cross-sectional opening of the actuator arm portion and beyond the surface of the actuator arm towards the surface of the disc contacting the surface of the disc, dampening contact between the actuator arm portion and the surface of the disc, as a result of a mechanical shock supplied to the disc drive.

7. The improvement of claim 6, wherein the dampening means is formed from a process comprising the steps of:
    providing the bumper material in a configuration having a diameter sized to nominally fit within the cross-sectional opening of the rigid actuator arm portion;
    disposing the bumper material within the cross-sectional opening of the rigid actuator arm portion; and
    deforming the bumper material to form an actuator arm bumper.

8. The improvement of claim 6, wherein the bumper material comprises polycarbonate.

9. A disc drive assembly, comprising:
    a base deck;
    a spindle motor mounted to the base deck;

a disc mounted to the spindle motor for rotation about a central axis, the disc having a surface having an outer diameter with respect to the central axis of the disc;

an actuator assembly mounted to the base deck adjacent the disc, the actuator assembly controllably rotatable about an axis parallel to the central axis of the disc, the actuator assembly comprising an actuator arm, the actuator arm including an actuator arm portion radially extending adjacent the surface of the disc, the actuator arm portion having a cross-sectional thickness with respect to the central axis of the disc, the wherein actuator assembly further comprises a gimbal assembly swaged to a distal end of the actuator arm portion to form a swaged connection therebetween, the swaged connection including a cylindrically shaped interior surface extending through the cross-sectional thickness of the actuator arm portion, the cylindrically shaped interior surface defining a swaging hole; and an actuator arm bumper secured to the actuator arm portion, the actuator arm bumper comprising a bumper material extending beyond the cross-sectional thickness of the actuator arm portion, the bumper material disposed through the swaging hole of the swaged connection, the actuator arm bumper dampening contact between the actuator arm portion and the surface of the disc as a result of a mechanical shock supplied to the disc drive.

\* \* \* \* \*